Oct. 29, 1963  D. D. BROWN ETAL  3,108,813
MASONRY EXPANSION JOINT SEAL
Filed April 19, 1960

INVENTORS:
DELMONT D. BROWN
HOWARD R. BROWN
BY
Marzall, Johnston, Cook + Root
ATT'YS 2,108,813
Patented Oct. 29, 1963

3,108,813
MASONRY EXPANSION JOINT SEAL
Delmont D. Brown and Howard R. Brown, North Baltimore, Ohio, assignors to The D. S. Brown Company, North Baltimore, Ohio, a corporation of Ohio
Filed Apr. 19, 1960, Ser. No. 23,192
6 Claims. (Cl. 277—1)

This invention relates to a movable, flexible sealing device, and more particularly to an expansion joint seal for sealing a masonry joint.

Heretofore, seals for closing masonry joints have not been satisfactory in that they have had too much resilience or a high coefficient of compression thereby tending to force the bricks or blocks apart when they are being laid up with green mortar thereby producing a defective masonry structure. Moreover, it may be stated in another way that the seals have been too stiff to compress and thereby not readily forming a movable, flexible sealing element.

Therefore, it can be appreciated that it would be desirable to have a seal for masonry joints which is movable and flexible, and has a relatively low coefficient of compression.

The seal of the present invention comprises an extruded tubular member of a closed cell sponge piece of material that is turned inside out after being extruded. This seal has a relatively low coefficient of compression and when pressure is brought to bear against the outer tensioned surface, it will tend to form a smooth, full contact with whatever material it bears against.

Therefore, it is an object of this invention to provide an improved movable and flexible seal for masonry expansion joints.

Another object of this invention is to provide an expansion joint seal comprised of an extruded tubular member of a closed cell spongy material, which is reversed on itself after extrusion thereby placing the outside wall under tension.

Still another object of this invention resides in the provision of an extruded tubular seal for masonry expansion joints that effects a positive seal in a joint.

A further object of this invention resides in the provision of a masonry expansion joint seal that has a relatively low coefficient of compression.

A still further object of this invention is to provide a masonry expansion joint seal of extruded closed cell neoprene sponge in tubular form that is substantially impermeable to water vapor and air.

Other objects, features and advantages of the invention will be apparent from the following detailed disclosure, taken in conjunction with the accompanying sheet of drawing, wherein like reference numerals refer to like parts, in which.

Figure 2:
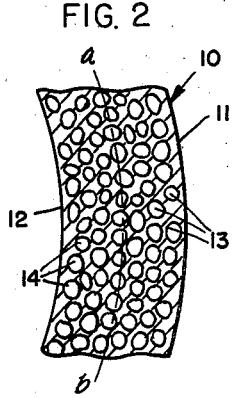
FIG. 2 is an enlarged fragmentary transverse sectional view taken through the seal of FIG. 1 and illustrating diagrammatically the closed cells formed in the material.
Figure 4:
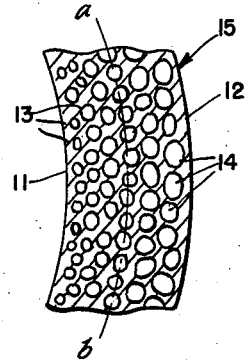
Figure 5:
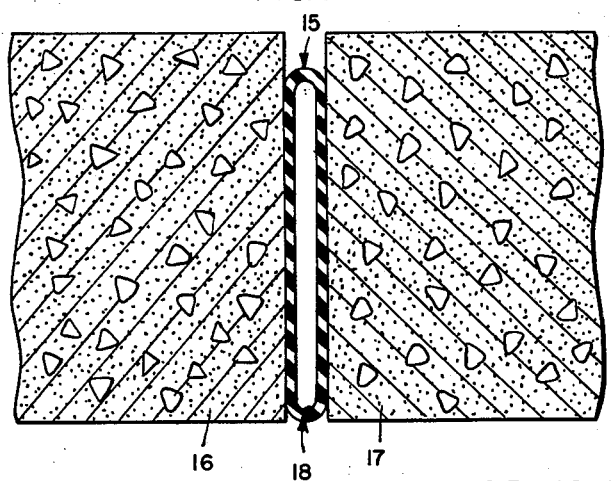

FIG. 4 is an enlarged fragmentary sectional view like FIG. 2, but taken from a seal that has been turned inside out and illustrating diagrammatically that the closed cells adjacent the outside surface of the seal are somewhat enlarged because of the tensioning of the outside surface, and the cells adjacent the inside surface as being slightly reduced in size or compressed; and FIG. 5 is a fragmentary sectional view taken through a masonry expansion joint and illustrating the seal of the present invention as being installed in a joint.

The seal of the present invention may be constructed of any suitable closed cell spongy material, having a resilience such that the ultimately constructed seal will have a relatively low coefficient of compression, and thus define a movable, flexible seal. Preferably, the seal may be constructed of a closed cell spongy material that is substantially impermeable to water vapor and air. It has been found that closed cell neoprene sponge is satisfactory.

Any of the known methods of making closed cell spongy material may be employed for extruding the tubular seal of the present invention. For example, one suitable method involves adding a nitrogen releasing material to the raw polymer which, when heated, releases nitrogen gas which in turn forms air pockets in the material defining the closed cells.

Figure 1:
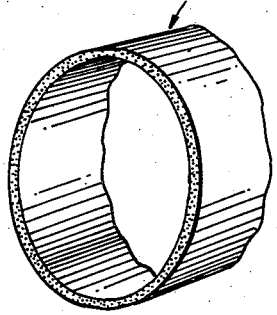
FIG. 1 is a fragmentary perspective view of an expansion joint seal after it has been extruded.

Referring now particularly to the drawings, an elongated extruded tubular member 10 is shown in FIG. 1 and depicted as having been extruded in the first stage of making the seal of the present invention. As seen in FIG. 2, the arcuate broken line $a$—$b$ illustrates the approximate central area of a section of the side wall of the member, wherein the outside surface is designated by the numeral 11 and the inside surface is designated by the numeral 12. A plurality of closed cells are shown between the outside and inside surfaces, and the cells on the right-hand side of the broken line $a$—$b$, designated by the numeral 13, are shown to be approximately the same size as the cells on the left-hand side of the line $a$—$b$ and designated by the numeral 14.

Figure 3:
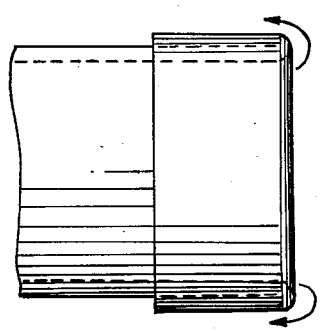
FIG. 3 is a fragmentary front elevational view of the seal of FIG. 1 and illustrating how it is turned inside out prior to being used in a masonry expansion joint.

FIG. 3 illustrates turning of the seal inside out whereby the outside surface becomes the inside surface and the inside surface becomes the outside surface. For purposes of illustrating the change in condition of the material upon turning the tubular member inside out, FIG. 4 depicts the closed cells 14 now on the right-hand side of the line $a$—$b$ and in a slightly expanded condition, and the closed cells 13 adjacent what was the outside wall 11 now on the left-hand side of the line $a$—$b$ and slightly reduced or compressed in size. Thus, turning the tubular member 10 inside out places the wall 12 which was the inside wall now on the outside and under tension and thereby defines the seal of the present invention and generally designated by the numeral 15 in FIG. 4.

Referring now to FIG. 5, adjacent bricks or blocks 16 and 17 define a masonry expansion joint 18 having the seal 15 of the present invention installed by virtue of reversing on itself the extruded tubular member to define the seal 15 and place the outside wall under tension, when pressure is brought to bear against this outside surface, the material of the seal tends to form a smooth, full contact with the adjacent bricks or blocks thereby affording a good and positive seal. And because the seal of the present invention has a relatively low coefficient of compression, this being less than 1½ pounds per square foot, the seal will not tend to push apart the bricks or blocks before they are set with the mortar. Further, the coefficient of compression of the seal is generated primarily from the tubular shape thereof rather than from the compression of the closed cells which define the walls of the seal. If the extruded tubular member is used as formed in FIG. 1 without turning the inside out, the walls of the member will tend to bow and gap away from the bricks or blocks thereby defining a defective seal.

It has been found that a satisfactory seal may be constructed wherein the walls are ⅛ of an inch thick and the top to bottom length as shown in FIG. 3 is approximately 3⅛ inches, while the width of the expansion joint is approximately ⅜ inch. In other words, the said seal formed by the tubular member is compressed in said joint to a thickness equal to approximately three times a wall thickness of said tubular member. At either or both ends of the seal 15, as shown in FIG. 5, caulking may be provided to conceal the seal and for what other purposes may be desired.

From the foregoing, it will be appreciated that the seal of the present invention is movable and flexible but yet constructed to provide a positive seal against the surfaces upon which it is brought to bear and to provide a constant sealing pressure on the entire contact area.

It will be understood that modifications and variations may be effected without departing from the scope of the novel concepts of the present invention, but it is understood that this application is to be limited only by the scope of the appended claims.

The invention is hereby claimed as follows:

1. An expansion joint comprising parallel spaced opposing surfaces and an expansion joint seal compressed in the space between said surfaces and in contact with said opposing surfaces, said expansion joint seal comprising an elongated extruded tubular member of resilient material, said material being cellular and having a plurality of closed cells, and said member being turned completely inside out thereby placing what was the inside wall surface as extruded on the outside and under tension to define a smooth outside surface and the outside wall surface as extruded on the inside and under compression, said seal being compressed to a thickness equal to about three times the wall thickness.

2. In a masonry expansion joint, the combination of a pair of spaced apart masonry units and an expansion joint seal therebetween, said seal comprising an elongated extruded tubular member of closed cellular resilient material, said tubular member being turned completely inside out to place the inside surface as extruded on the outside and the outside surface as extruded on the inside, and said seal being compressed in said joint to a thickness equal to approximately three times a wall thickness of the member, wherein the inside surface as extruded being on the outside engages the facing surfaces of the masonry units.

3. In a masonry expansion joint, the combination of a pair of spaced apart masonry units and an expansion joint seal therebetween, said seal comprising an elongated extruded tubular member of closed cellular resilient material, said material being neoprene sponge and substantially impermeable to water vapor and air, said tubular member being turned completely inside out to place the inside surface as extruded on the outside and the outside surface as extruded on the inside, and said seal being compressed in said joint to a thickness equal to approximately three times a wall thickness of the member, wherein the inside surface as extruded being on the outside engages the facing surfaces of the masonry units.

4. The combination as defined by claim 2, wherein said seal has a relatively low coefficient of compression when in use.

5. The combination as defined by claim 4, wherein the coefficient of compression is less than one and one-half pounds per square foot when in use.

6. The method of making a masonry expansion joint seal comprising the steps of extruding an elongated tubular member of closed cell rubber material, turning the member completely inside out thereby placing the inside surface as extruded on the outside and the outside surface as extruded on the inside, and compressing the member between parallel facing masonry units to a thickness equal to approximately three times the wall thickness of the member.

References Cited in the file of this patent
UNITED STATES PATENTS

| | | |
|---|---|---|
| 1,885,391 | Thompson et al. | Nov. 1, 1932 |
| 2,292,290 | Robins | Aug. 4, 1942 |
| 2,832,614 | Settle | Apr. 29, 1958 |
| 2,914,845 | Crites | Dec. 1, 1959 |